Nov. 24, 1942.   G. R. DEMPSTER   2,302,666
TRANSPORTING AND DUMPING DEVICE
Filed Oct. 14, 1940   3 Sheets-Sheet 3

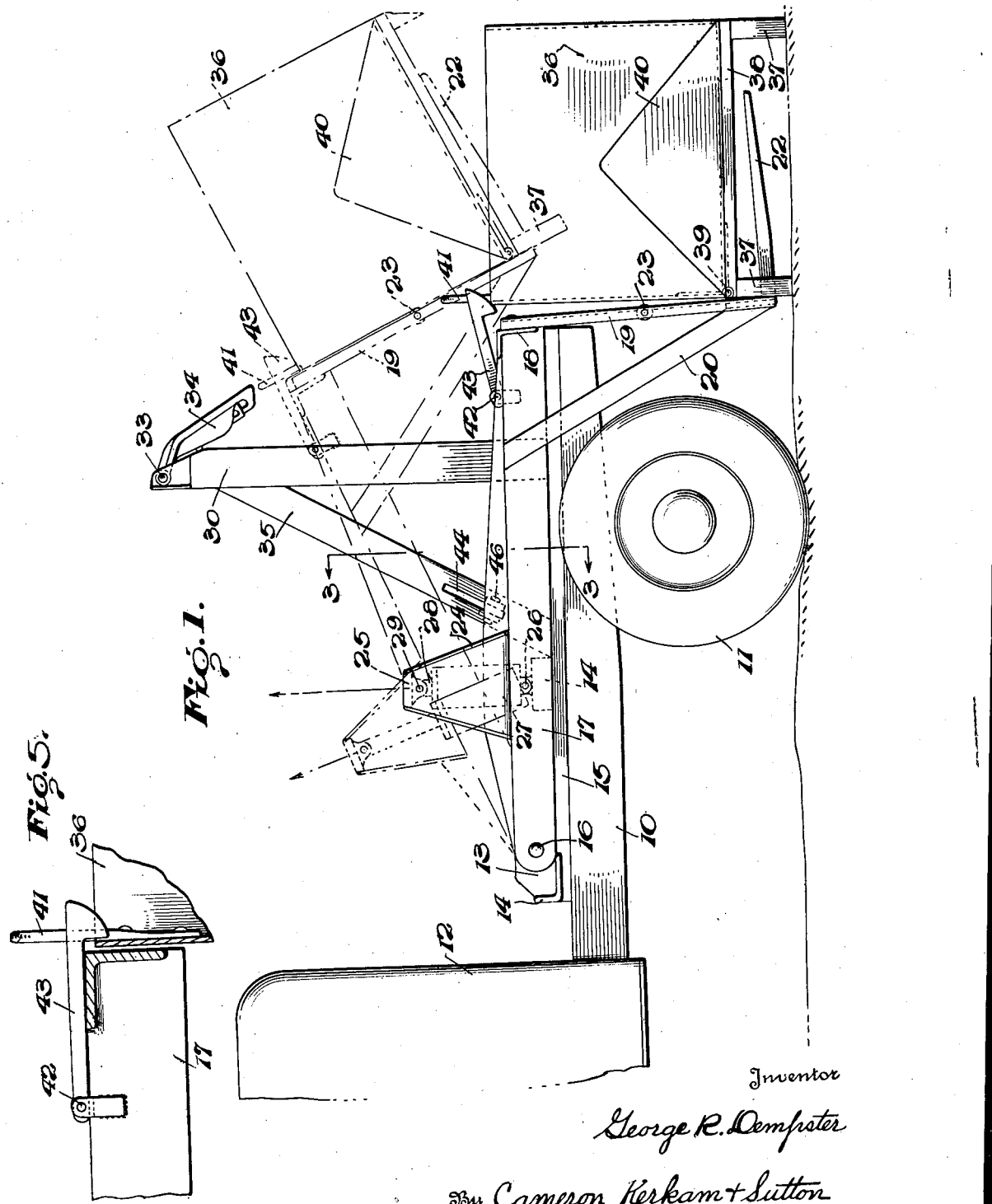

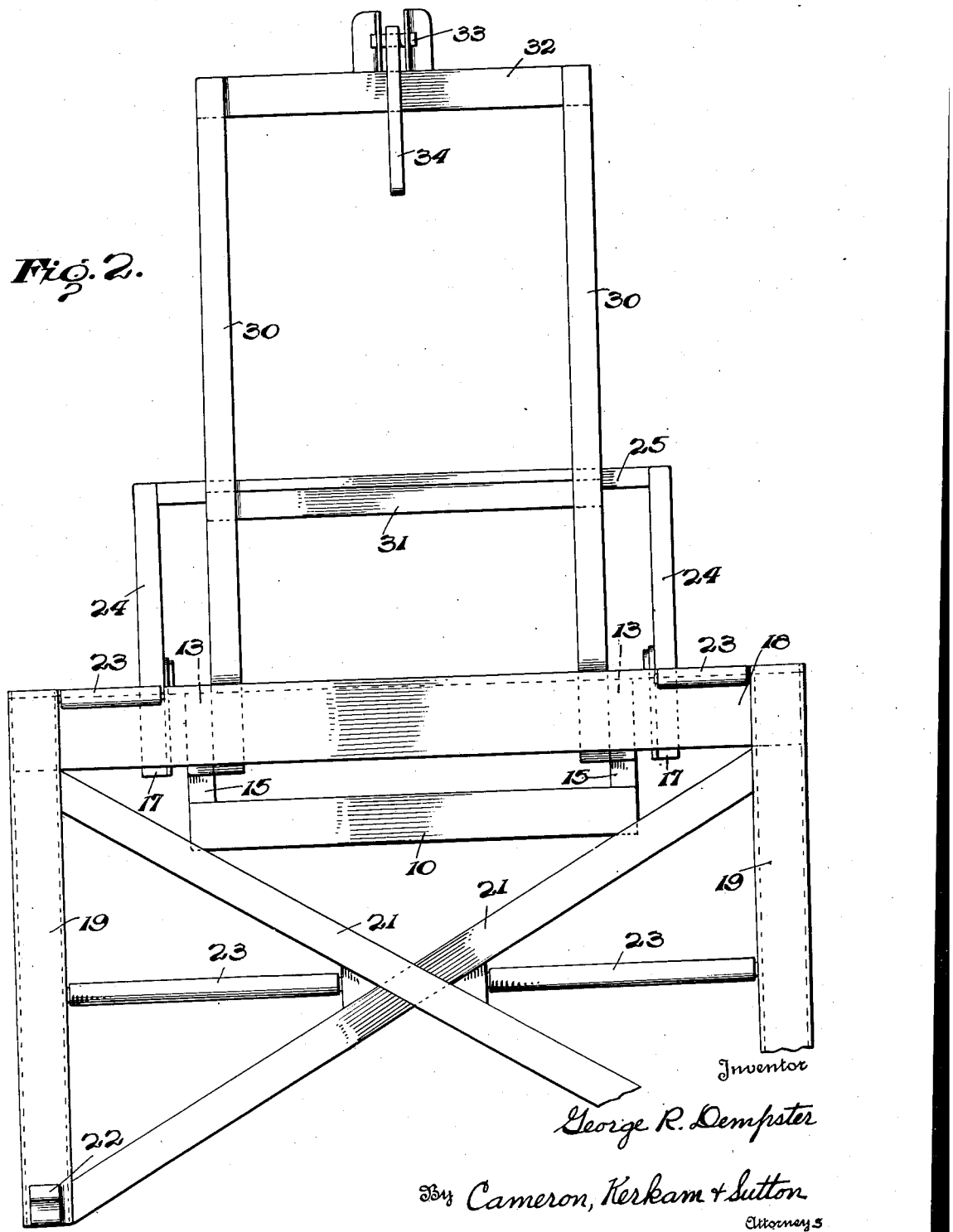

Patented Nov. 24, 1942

2,302,666

UNITED STATES PATENT OFFICE 2,302,666

TRANSPORTING AND DUMPING DEVICE

George R. Dempster, Knoxville, Tenn.

Application October 14, 1940, Serial No. 361,146

8 Claims. (Cl. 214—131)

This invention relates to transporting and and dumping devices and more particularly to transporting and dumping devices utilizing a separate transporting and dumping container.

Heretofore transporting and dumping devices using a transporting and dumping container have been used but in these it has been necessary to manually connect the lifting chains to the transporting and dumping container before the container can be raised, transported and dumped and it has been necessary to manually unhook the lifting chains after the transporting and dumping operations. It has been found desirable in many cases to save time and delay and, in so far as possible, to dispense with all manual operations during the picking up, transporting, dumping and replacing of the container.

It is accordingly an object of the present invention to provide a novel transporting and dumping device in which manual operations are dispensed with during the pick up, transportation, dumping and replacing of the transporting and dumping containers.

Another object of the present invention is to provide a novel transporting and dumping device in which the transporting and dumping vehicle can be placed adjacent the transporting and dumping container and lift the same to transporting or to dumping position without manual intervention.

Another object of the present invention is to provide a novel transporting and dumping vehicle in which the transporting and dumping container is raised to transporting position without manually connecting lifting devices to the container.

Another object of the present invention is to provide a novel transporting and dumping device in which the transporting and dumping container can be lifted to transporting position without the manual operation of connecting lifting devices and which may be raised thereafter to dumping position without further manual operation.

Another object of the present invention is to provide novel automatic means for supporting the lifting mechanism of the novel transporting and dumping device of the present invention in transporting position.

Another object of the present invention is to provide novel automatic means for steadying the transporting and dumping container on the lifting means during transportation.

Another object of the present invention is to provide a novel transporting and dumping device which is of relatively simple construction, durable, relatively cheap to manufacture and which can be operated by unskilled operators.

Other and further objects of the present invention will appear as the description thereof proceeds.

An illustrative embodiment of the present invention is shown in the accompanying drawings but it is to be expressly understood that the embodiment of the present invention shown in the accompanying drawings and hereafter described is shown and described for the purposes of illustration only and should not be construed as limiting the scope of the present invention. The scope of the present invention will be defined in the accompanying claims.

In the drawings,

Fig. 1 is a side view of an illustrative embodiment of the novel transporting and dumping device of the present invention showing the device in position for picking up the transporting and dumping container and showing, in dotted lines, the device raising the transporting and dumping container toward dumping position;

Fig. 2 is a view of the embodiment of Fig. 1, as seen from the right in Fig. 1, the transporting and dumping container being omitted;

Fig. 3 is a cross-sectional view of the embodiment of Fig. 1 on the line 3—3 of Fig. 1;

Fig. 4 is an enlarged detail of Fig. 1 showing the novel automatic supporting means for supporting the lifting mechanism during transportation; and Fig. 5 is an enlarged detail of Fig. 1 showing the means provided for steadying the transporting and dumping container on the elevating means.

In the several figures, in which like reference characters indicate similar parts, 10 is the chassis of any suitable vehicle provided with rear wheels 11 and a cab 12. Mounted and suitably secured on chassis 10 are channel members 13 which are spaced apart and suitably secured together by cross members 14. Suitable stringers 15 of wood or other suitable material may be interposed between the chassis 10 and the channel members 13.

Pivotally mounted on channel members 13, as at 16, are boom arms 17. Secured to the rear end of boom arms 17 is cross member 18 which in turn carries downwardly extending members 19. Members 19 are suitably braced with respect to boom arms 17 by brace members 20 and are interbraced by cross braces 21. Suitably secured to members 19 and extending rearwardly therefrom are forks 22. Suitable rollers 23 may be mounted within the framework provided by cross member 18, members 19 and cross braces 21 for purposes hereafter to be described.

Suitably secured to boom arms 17 are uprights 24 joined by a suitable headframe 25. Pivotally mounted on a cross member 14, as at 26, is a suitable cylinder 27 provided with a piston and piston rod 28. Rod 28 is pivotally connected to headframe 25, as at 29 (Fig. 3).

Secured to channel members 13 are vertically extending members 30 which are suitably spaced and reinforced by a cross member 31 (Fig. 2) and a headframe 32. Pivotally mounted on headframe 32, as at 33, is a suitable automatic hook or catch 34. Members 30 are suitably braced by braces 35 secured to channel members 13 at their lower ends.

A suitable transporting and dumping container 36 is shown in the drawings provided with supporting legs 37 secured to its bottom 38. Bottom 38 is pivoted to the rear wall of the container at 39 and as shown it may have upstanding side members 40 which fit into suitable cutaway portions of the sides of the container 36 when bottom 38 is in closed position. Container 36 is provided with a bail 41 secured to the rear wall of the container and adapted to be engaged by the automatic hook or catch 34 when container 36 is raised to dumping position.

Pivotally mounted on boom arms 17, as at 42 (Fig. 5), are latches 43 adapted to drop over the rear wall of container 36 when the container is raised to transporting position to steady the container in place.

Referring particularly to Fig. 4, suitable automatic means are there shown for supporting boom arms 17 when in transporting position. Braces 35 are suitably slotted at 44 (Fig. 1) to receive supporting members 45 mounted on pivots 46. Supporting members 45 are provided with surfaces 47 and 48 to receive and support boom arms 17. Springs 49 are provided to urge supporting members 45 to their normal positions.

With the novel transporting and dumping device of the present invention set up as above described, when it is desired to transport and dump a suitable transporting and dumping container, the boom arms 17 are lowered and the vehicle so placed that forks 22 are disposed beneath the transporting and dumping container. Thereafter the piston and the piston rod 28 in cylinder 27 are energized and boom arms 17 are raised upwardly about pivots 16 and forks 22 contact bottom 38 of the transporting and dumping container and raise the transporting and dumping container off the ground. When the transporting and dumping container is raised from the ground it tilts back against rollers 23 and latches 43 drop over the rear wall of the container to steady it in place. Further upward movement of boom arms 17 bring them into contact with the lower edges of supporting members 45 and rotate members 45 about pivots 46 into the upward positions shown in dotted lines in Fig. 4. Further upward movement of boom arms 17 raise them above the outer end of surfaces 48 whereupon springs 49 rotate supporting members 45 about pivots 46 until surfaces 47 come into contact with boom arms 17. Thereafter boom arms 17 may be lowered until both surfaces 47 and 48 are in contact therewith forming supports for boom arms 17 during transportation of the load. With the weight of the container efficiently distributed over the forks 22 and members 19 and 21 which because they are upwardly inclined form an upwardly opening cradle for the container and steadied by latches 43 high vehicle speeds can be had without shift of load or danger on curves.

When dumping position is reached boom arms 17 are raised freeing supporting members 45 which are then returned to their normal positions by springs 49 and container 36 is elevated until bail 41 is engaged by the automatic hook or catch 34. Thereafter boom arms 17 are lowered, the pressure of the inner surfaces of the heads on the hooks on the cooperating surfaces of the container, here shown only diagrammatically, causing the hooks to be cammed around their pivots 42 to release the container, and as forks 22 no longer support bottom 38 it rotates about its pivot 39 and dumps the container, rollers 33 acting to decrease the friction incident to the sliding of the back of the container along the several supporting and bracing members at the back of the container. After the container is dumped boom arms 17 are again raised and forks 22 rotate bottom 38 about its pivot 39 closing the container and thereafter elevate the container to disengage the automatic hook or catch 34 from the bail 41. The container is then lowered to transporting position and boom arms 17 pass over supporting members 45 rotating them about pivots 46 to the downward position shown in dotted lines in Fig. 4. Further downward movement of boom arms 17 free supporting members 45 which are returned to their normal positions by springs 49. Thereafter boom arms 17 may be raised, as above described, to place supporting members 45 in their supporting positions for returning the empty container to the place of loading.

All the movements of the boom arms 17 as described above are of course controlled and performed by the piston and piston rod 28 energized by the motive fluid supplied to cylinder 27. The supply of motive fluid to cylinder 27 is controlled by the vehicle operator in the cab 12. The operation of the novel transporting and dumping device of the present invention is therefore performed without the operator leaving the cab with consequent saving of time.

It will now be apparent that the present invention provides a novel transporting and dumping device utilizing a transporting and dumping container in which no manual operations are necessary to place the container and the lifting mechanism in operative condition; in which all manual operations incident to the raising of the transporting and dumping container by the elevating mechanism are dispensed with; in which novel means are provided for supporting the elevating mechanism during transportation; in which novel means steady the container on the lifting mechanism; and which is relatively simple, cheap to manufacture and easy to operate.

To those skilled in the art changes to or modifications of the above described illustrative embodiment of the present invention will now be suggested without departing from the inventive concept. For instance, any other suitable type of transporting and dumping container may be used other than that shown and described for the purposes of illustration and other suitable lifting mechanisms may be employed for raising the boom arms. Further, the automatic hook or catch may be dispensed with or other suitable container-supporting means used to support the container during dumping operations. The forks may be pivoted to fold up out of the way and suitable means provided for suspending the container from the cross member so that the device of the present invention may be used in cases where suspension of the container is desirable. To determine the scope of the present invention therefore reference should be had to the appended claims.

What is claimed is:

1. In a transporting vehicle, a power actuated boom pivoted to the chassis of the vehicle above the same for movement upwardly away from and downwardly toward the chassis, a drop bottom container, a bail secured to the rear wall of said container, means depending from said boom, forks carried by said depending means to engage the bottom of said container when the boom is lowered, said forks adapted to elevate said container when said boom is raised and said depending means and said forks when elevated being upwardly inclined to hold said container in an upwardly opening cradle, and an automatic hook or catch to engage said bail and support said container in dumping position.

2. In a transporting vehicle, a pivoted power actuated boom, means carried by said boom for engaging the bottom of a separate container to elevate the container, and automatic means carried by said boom to engage the container when elevated and lock the container against said boom-carried means to prevent displacement of said container.

3. In a transporting vehicle, a pivoted power actuated boom, means carried by said boom for engaging the bottom of a separate container to elevate the container and automatic means engaging and supporting said boom in transporting position and preventing lowering of said boom below its position for transporting the container.

4. In a transporting vehicle, a pivoted power actuated boom, means carried by said boom for engaging the bottom of a separate container to elevate the container, and automatically actuated latch means carried by said boom to engage over the wall of the container when elevated for steadying the same.

5. In a transporting vehicle, a pivoted power actuated boom, means carried by said boom for engaging the bottom of a separate container to elevate the container, and automatic supporting means to lock said boom in transporting position and prevent lowering of said boom without first raising the same.

6. In a transporting vehicle, a boom pivoted to the chassis of the vehicle above the same, means for raising and lowering the boom upwardly away from and downwardly toward the chassis, means depending from the rear of said boom, means projecting outwardly and rearwardly from the lower end of said depending means for engagement with the underside of a container to elevate and transport the container, and latch means mounted on the chassis and engaged by the boom and moved out of the way as the boom is elevated, said latch means then moving automatically into engagement with the boom to prevent lowering of the latter below the position for transporting the container.

7. In a transporting vehicle, a boom pivoted to the chassis of the vehicle above the same, means for raising and lowering the boom upwardly away from and downwardly toward the chassis, means depending from the rear of said boom, and means projecting outwardly from the lower end of said depending means in a substantially perpendicular relationship therewith to engage the underside of a container to elevate the container and so constructed and arranged that when elevated the container tilts and rests against said depending means to support and steady the container.

8. In a transporting vehicle, a boom pivoted to the chassis of the vehicle above the same, means for raising and lowering the boom upwardly away from and downwardly toward the chassis, means depending from the rear end of said boom, means projecting rearwardly at substantially a right angle from the lower end of said depending means to engage the bottom of a container to elevate the container, and latch means carried by said boom and so constructed and arranged that when the container is elevated the latches will engage the rear wall of the container and hold the same against said depending means.

GEORGE R. DEMPSTER.